United States Patent [19]

Mueller

[11] 3,932,740

[45] Jan. 13, 1976

[54] METHOD AND APPARATUS FOR PROCESSING TWO D.C. VOLTAGES, ESPECIALLY REPRESENTING UNBALANCE COMPONENTS

[75] Inventor: Martin Mueller, Bickenbach, Germany

[73] Assignee: Firma Carl Schenck AG, Darmstadt, Germany

[22] Filed: Sept. 16, 1974

[21] Appl. No.: 506,210

[30] Foreign Application Priority Data
Sept. 27, 1973 Germany............................ 2348498

[52] U.S. Cl................................ 235/186; 235/189
[51] Int. Cl.² ......................................... G06G 7/22
[58] Field of Search................. 235/186, 189, 150.2; 73/65, 66

[56] References Cited
UNITED STATES PATENTS

| | | | |
|---|---|---|---|
| 2,980,331 | 4/1961 | Gruber et al. | 235/189 |
| 3,180,976 | 4/1965 | Robinson | 235/189 |
| 3,473,011 | 10/1969 | Schmid | 235/189 X |
| 3,555,541 | 1/1971 | Egerton, Jr. et al. | 235/186 X |
| 3,631,233 | 12/1971 | McKenna | 235/186 |

*Primary Examiner*—Joseph F. Ruggiero
*Attorney, Agent, or Firm*—W. G. Fasse; W. W. Roberts

[57] ABSTRACT

In a method and apparatus for processing a pair of d.c. signals representing information having angular and amplitude components, in particular, information relating to the unbalance of a body to be balanced, coordinate transformation means are provided in order to transform the coordinates of the two d.c. signals in response to a control signal, the control signal being continually adjusted in a direction dependent upon the polarity of the outputs of the coordinate transformation means, until one of the outputs of the coordinate transformation means becomes 0. In this case, the control signal corresponds to the angular information of the two d.c. voltages, and the output on the other output terminal of the coordinate transformation means corresponds to the amplitude information. Means are also provided for stopping the adjustment of the control signal, whereby a source of d.c. signals corresponding to angular information may be applied to the inputs of the coordinate transformation means, in order to enable adjustment of the d.c. signals so that they correspond to the same angle as the signal applied to the control input of the coordinate transformation means. The two d.c. signals may correspond to the angular position of a body to be balanced.

20 Claims, 4 Drawing Figures

METHOD AND APPARATUS FOR PROCESSING TWO D.C. VOLTAGES, ESPECIALLY REPRESENTING UNBALANCE COMPONENTS

BACKGROUND OF THE INVENTION

The invention relates to a method and an apparatus for processing of two d.c. voltages, especially representing unbalance components.

German Patent No. 1,108,475 discloses a method for determining the unbalance of a rotational body. According to said known method, two square wave voltages are produced which are phase shifted relative to each other and which are then mixed with each other. These square wave voltages are produced from two voltages which are stored as analog values and which represent the unbalance components of the rotational body to be balanced. The square wave voltages have actually a stairstep shaped wave form and according to the known method the fundamental sine wave is filtered out of the stairstep signal, whereby the amplitude of the fundamental sine wave is proportional to the unbalance and whereby the phase position of the fundamental wave relative to one of the square wave voltages represents the unbalance angle, which is an angle defining the angular position of the unbalance on the rotational body relative to a reference mark.

The above described prior art method has the disadvantage that it is not too precise, especially with regard to the indication of the unbalance angle, because several method steps must be performed in sequence in order to ascertain the unbalance vector and because a precisely tuned and constant filter is required. Filters do not tend to retain their characteristics precisely, especially where temperature changes must be taken into account. Thus, the ascertaining and display of the polar unbalance information, especially of the angular position of the unbalance is necessarily subject to errors. Furthermore, the known method does not provide any possibility for directly storing the unbalance angle, rather, said angle can only be retained indirectly through the component direct voltages. As a result, additional angular errors may occur, especially as time passes and such additional angular errors may substantially influence the total error. This is so, as it is known, that the error occurring during the ascertaining, the storing and the display of the unbalance angle enters into the total error more strongly than the unbalance value itself, namely, by a factor of $2\pi$.

OBJECTS OF THE INVENTION

In view of the foregoing, it is the aim of the invention, to achieve the following objects singly or in combination:

to provide a method and circuit arrangement for the processing of unbalance representing d.c. voltages which will avoid the drawbacks of the prior art by permitting a precise ascertaining display and processing of the d.c. voltage signals representing the unbalance angle and which will also permit a rapid, as well as unlimited storage of the unbalance representing values;

to provide a method and apparatus which is especially suitable for use in combination with machines for the removal of the unbalance, so called balancing machines;

to provide a method which will prevent the attempt of a balancing machining or operation in an area on the body to be balanced, which area has been already subjected to a balancing operation in a preceding operational step;

to adapt the balancing operation to the physical characteristics of the body to be balanced, in other words, to control the balancing operation to take place, for example, in at least two steps;

to provide means for exactly ascertaining the unbalance angle in precise digital steps;

to eliminate ambiguities from the signals employed for controlling the balancing operation; and to provide in addition to the rapid ascertaining of the unbalance values an unlimited possibility of storing such ascertained values.

SUMMARY OF THE INVENTION

The above objects have been achieved according to the invention by a method in which the d.c. voltages representing the unbalance features are separately supplied to a coordinate transformation device. The coordinate transformation device has a control input connected to a control member or circuit which in turn is controlled by the output voltages of the coordinate transformation device. The control member is adjusted until one of the output voltages of the coordinate transformation device reaches 0, at which point the other output voltage of the coordinate transformation device represents the value of the unbalance, and whereby the position of the control member represents the angular location of the unbalance. According to the invention, the control member is preferably adjusted in discrete steps, whereby these steps may be displayed and stored in a digital manner since thereby the full advantage may be taken of the fact that according to the invention a high precision is accomplished.

In order to adapt the above method to the positioning or adjustment of a body to be balanced, into an angular position corresponding to the angle of the unbalance, the invention further teaches that the control member is arrested in a fixed position after the unbalance representing angle has been ascertained, whereby such arrested position of the control member represents the unbalance angle. Thereafter, two voltages are supplied to the inputs of the coordinate transformation device, which voltages represent the instantaneous angular position of the body to be balanced. The body to be balanced is now adjusted or rotated in response to the now appearing output voltages of the coordinate transformation device, until one of the output voltages reaches the value 0, and the other output voltage reaches a predetermined polarity. This embodiment of the invention has the advantage that the same coordinate transformation device is employed for ascertaining the unbalance angle as well as for providing an adjustment for the locating of the body to be balanced, whereby errors or different errors of different coordinate transformation devices are substantially eliminated.

The apparatus for exactly ascertaining the unbalance representing angle as a function of the size or value of respective digital steps comprises, according to the invention, said coordinate transformation device, which includes multiplying digital to analog converter having first inputs to which are supplied the d.c. voltages representing the unbalance and second inputs connected to read only or fixed memories. The d.c. voltages supplied to the first inputs are either supplied directly or after polarity inversion. Said read only memories supply in response to the angular value representing signal supplied to the control input, digital sine or cosine values. The outputs of the multiplying digital to analog values are connected to adder elements which combine the output signals of these digital to analog converters.

BRIEF FIGURE DESCRIPTION

In order that the invention may be clearly understood, it will now be described, by way of example, with reference to the accompanying drawings, wherein.

Figure 1:
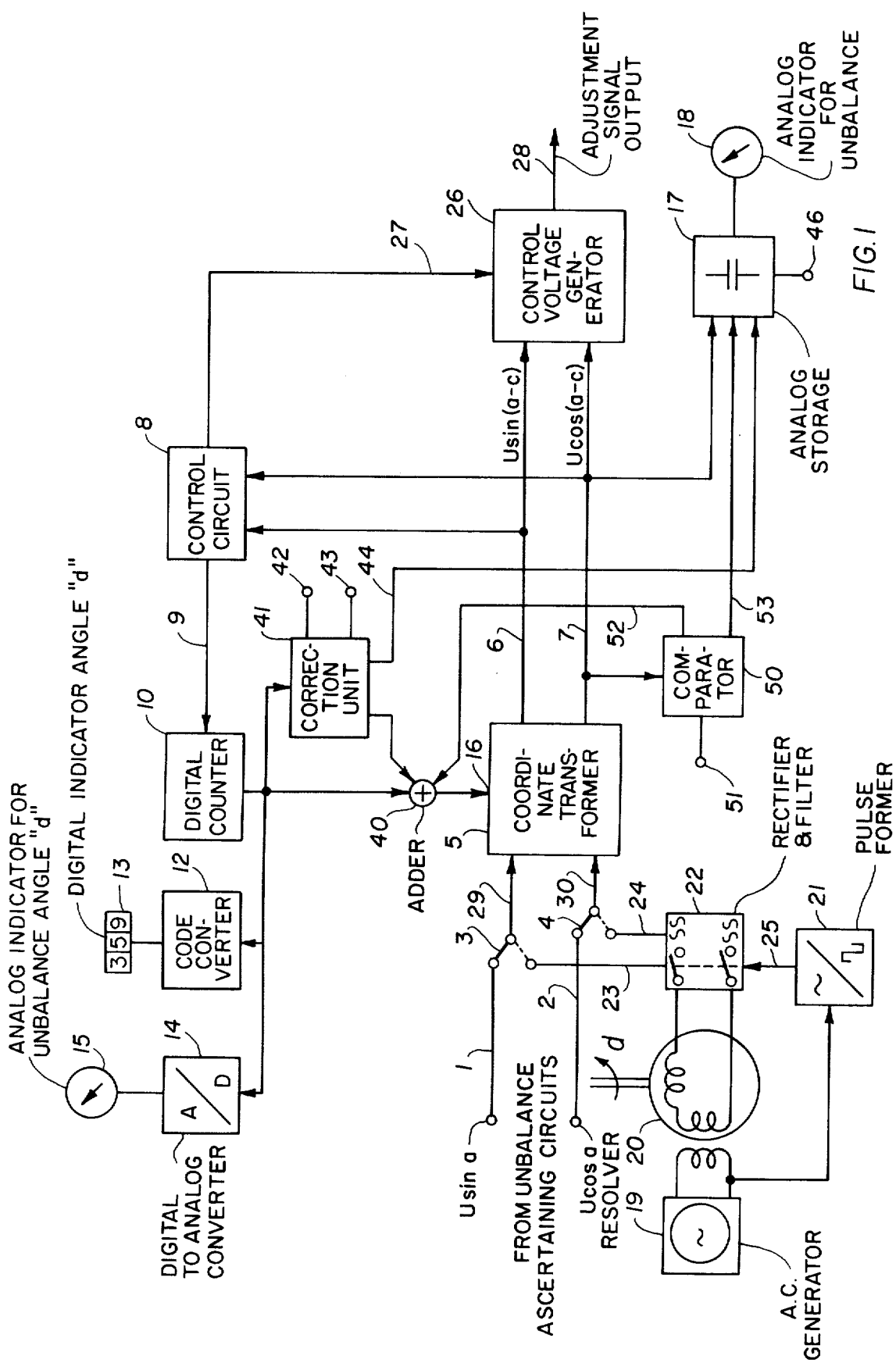
FIG. 1 illustrates a circuit diagram according to the invention suitable for performing the method according to the invention.
Figure 3:
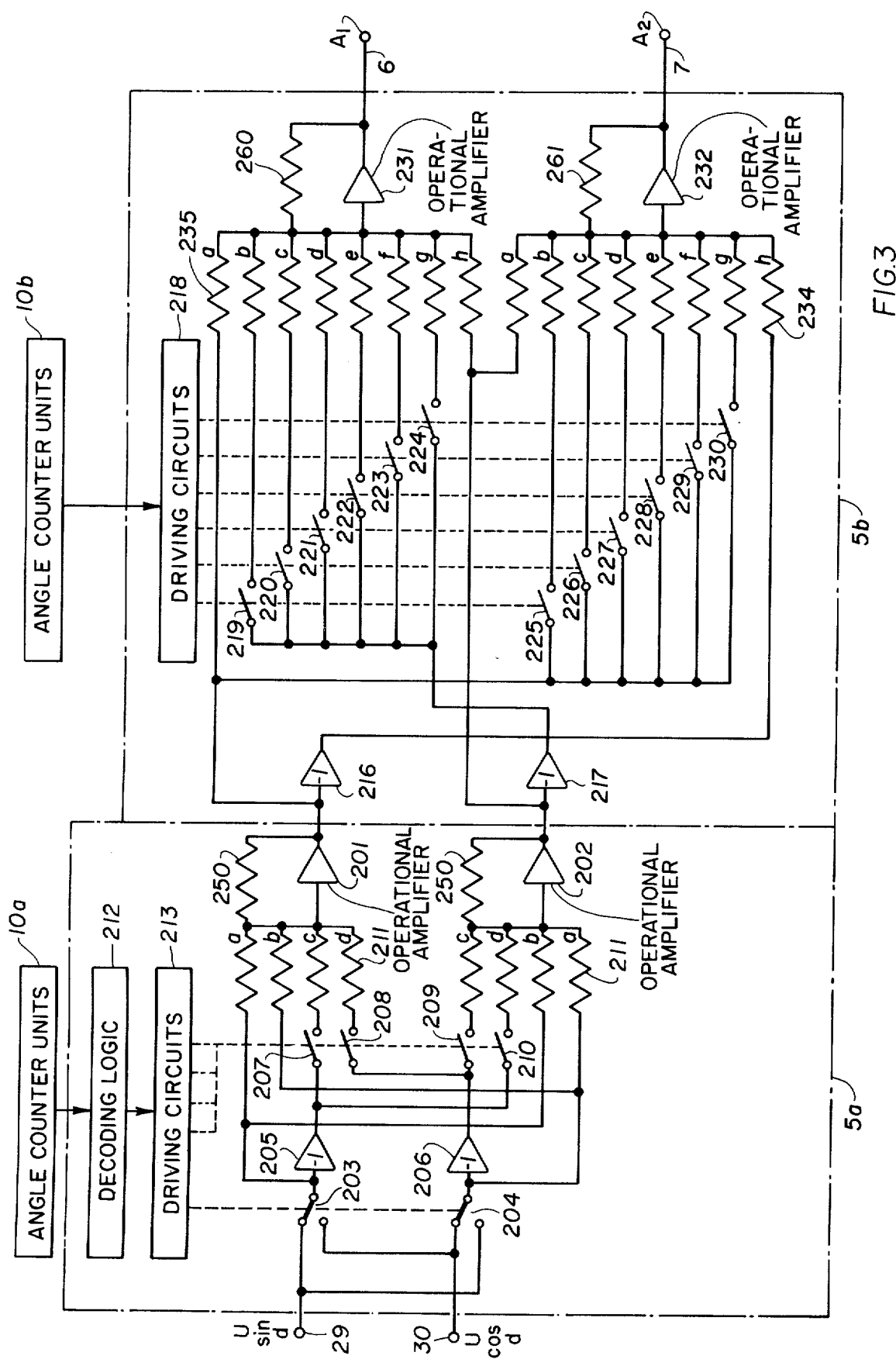
Figure 4:
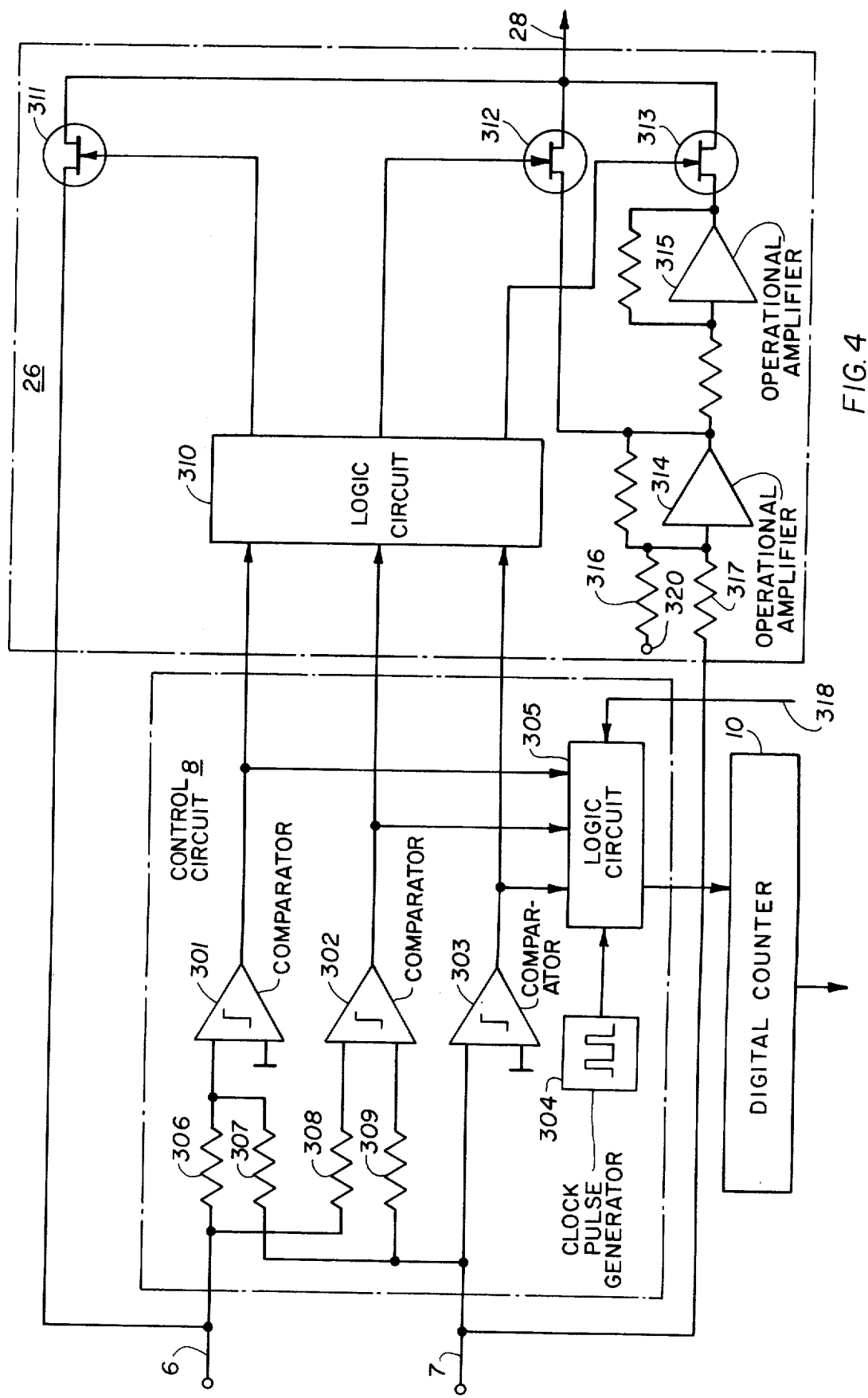

FIG. 3 illustrates a block diagram of another embodiment of a coordinate transformation device, which may be employed where an approximation is satisfactory; and FIG. 4 illustrates a block diagram of the control circuit or member and of the output voltage generator employed in FIG. 1, whereby the output voltage of said generator constitutes the signal for adjusting the body to be balanced into the proper position in which the balancing may be performed.

DETAILED DESCRIPTION OF EXAMPLE EMBODIMENTS

The circuit arrangement according to FIG. 1 comprises a coordinate transformation device 5 and includes two input conductors 1 and 2 which are connected to unbalance ascertaining circuits not shown, but well known in the art, for example outputs of tubes 118,119 in German Patent 1,108,475, FIG. 7. Such circuits supply d.c. voltages, $U \sin a$ and $U \cos a$, whereby U represents the value or quantity of the unbalance and '$a$' represents the unbalance angle. If necessary, these d.c. voltages may have been stored. The conductors 1 and 2 are connected through selector switches 3 and 4 to the inputs 29 and 30 of the coordinate transformation device 5, the details of which will be described below with reference to FIGS. 2 or 3. The coordinate transformation device 5 comprises a control input 16 to which is supplied a signal representing a digital number $c$ in response to which the device 5 performs a coordinate rotation. As a result, the outputs 6 and 7 of the device 5 supply respective d.c. voltages $U \sin (a-c)$ or $U \cos (a-c)$. A control circuit or member 8 is connected with its inputs to the outputs 6 and 7 of the coordinate transformation device 5. The control member 8 is connected through its output 9 to a digital counter 10, whereby the counter 10 is controlled in such a manner that the count will be increased, whereby the control signal $c$ will also be increased when a positive voltage appears at the output line 6. The count in the counter 10 is reduced when a negative voltage appears at the output line 6, whereby the control signal $c$ becomes smaller. Thus, a closed control or regulating feed-back circuit is provided which is adjusted by the counter 10 in response to the control circuit 8 until the voltage on the output conductor 6 becomes 0. At that instance, the control signal $c$ is equal to $a$ and thus equal to the unbalance angle to be ascertained. Simultaneously the voltage $U \cos (a-c)$ on the output conductor 7 becomes equal to U and thus equal to the value or quantity of the unbalance.

In view of the above, the control signal represented by the digital number $c$ corresponds to the unbalance angle $a$. If desired, a code converter 12 may be provided which is connected with its input to the output of the digital counter 10 and to the output of which there is connected a digital indicator 13 for displaying the unbalance angle directly as a digital number. Further, the unbalance angle may also be indicated by an analog indicator 15 connected to the digital counter 10 through a digital to analog converter 14. The d.c. voltage on the output conductor 7 represents the quantity of the unbalance U and may be indicated by an analog instrument 18, if desired after storage in an analog storage 17. The signal at the output of the analog storage 17 may also, if desired, be used as the control signal for the compensation of the unbalance, for example for a machining operation.

*) An analog storage can be built up with a condenser and a high input resistance amplifier as well known in the art.

In order to produce a signal for controlling the positioning of the body to be balanced, prior to performing a balancing operation, for example, a machining operation, or an operation in which material is added at certain spots on the body to be balanced, the counter 10 is arrested in its position corresponding to the unbalance angle, whereby the factors $\sin c$ and $\cos c$ of the device 5 are fixed. Simultaneously, it is necessary to produce a signal value representing the instantaneous angular position of the body to be balanced. Such instantaneous angle value $d$ may, for instance, be produced by rigidly connecting the body to be balanced with a digital coding disk carrying a marker which may, for example, be sensed by optical means. The resulting digital value $d$ representing the instantaneous value is then subtracted from the fixed digital value $c$ of the counter 10. The resulting difference is employed for the adjustment of the body to be balanced into a position in which the balancing operation may be performed. This may be done according to the invention, for example, by supplying the difference signal to a digital to analog converter, which produces a control voltage in the form of a d.c. voltage which is used to control the adjustment of the position of the body to be balanced, for example, through respectively energizing and adjusting a d.c. motor for rotating the body to be balanced until the difference value or rather the respective d.c. voltage becomes 0. According to an alternate embodiment of the invention, it is possible to use the digital value representing the difference angle directly for the adjustment of the body to be balanced. In this instance, the digital value represented by respective pulses may control a stepping motor which adjusts the position of the body to be balanced until the difference angle becomes 0.

Yet another possibility of producing a signal for controlling the adjustment of the position of the body to be balanced, is illustrated in FIG. 1. In this embodiment the digital counter 10 is also arrested in its position corresponding to the unbalance angle. In order to ascertain the instantaneous angular position $d$ of the body to be balanced two d.c. voltages $\sin d$ and $\cos d$ are produced by means of a resolver coupled to the body to be balanced and energized by an a.c. voltage generator 19. The two output voltages of the resolver 20 are converted into proportional d.c. voltages after rectification and filtering by a rectifier filter unit 22, which produces said direct output voltages at its output lines 23 and 24 connected to respective contacts of the selector switch 3. The rectifier filter unit 22 has a control input 25 connected to a pulse former circuit 21 which in turn is energized from the output of the a.c. generator 19 to control the rectification of the output voltages of the resolver 20. Instead of using the resolver 20 and the associated circuitry just described, it would be possible to employ a potentiometer having a sine - cosine characteristic, and which is supplied by d.c. voltages derived from a d.c. voltage source and which is mechanically connected with the body to be balanced, whereby such potentiometer would act as an angle pick-up or generator supplying its output voltages sin d and cos d directly to the output conductors 23 and 24.

By switching the selector switch 3 into its position shown with dashed lines, the conductors 23 and 24 are connected to the inputs 29 and 30 of the coordinate transformation device 5, thus receiving the d.c. voltages sin $d$ and cos $d$. As a result the output conductors 6 and 7 of the device 5 now supply the voltages sin $(d-c)$ and cos $(d-c)$ which are indicative of the instantaneous angular position of the body to be balanced respective to the unbalance angle.

The voltage on the conductor 6 becomes 0 if $d$ equals $c$. In this instance the angular position of the body to be balanced is equal to the angle $c$ stored in the angle counter 10, which in turn corresponds to the unbalance angle $a$. The same situation occurs where $d$ equals $c$ plus 180°. This might cause an ambiguity. However, such ambiguity has been eliminated according to the invention, because the voltage on the conductor 7 is positive for $d$ equals $c$ and it is negative for $d$ equals $c$ plus 180° so that a differentiation between the two 0 positions of the voltage on the conductor 6 is possible. The control circuit 8 has an output conductor 27 connected to control voltage generator 26 having an output 28 at which the adjustment or control signal appears. Two inputs of the control voltage generator 26 are connected to the output conductors 6 and 7 as shown in FIG. 1. Preferably, the absolute value of the voltage or signal appearing at the output 28 decreases in a monotone manner as the body to be balanced approaches the correct adjustment point. The polarity of this voltage indicates the direction in which the body to be balanced must be turned in order to reach the proper balancing position in the shortest possible distance, or rather in the shortest possible rotation. The adjustment signal appearing at the output 28 may be indicated on an instrument whereupon the operator adjusts the body to be balanced by hand in response to reading such instrument. In the alternative, the output 28 may be connected to means for automatically adjusting the body to be balanced. Such means are well known in the art.

It is possible to modify the unbalance angle $a$ prior to the adjustment of the body to be balanced into the balancing position. Such modifications could, for example, take into account special conditions or characteristics of the body to be balanced. Thus, in a preferred embodiment according to the invention, an adder 40 may be arranged between the angle counter 10 and the control input 16 of the coordinate transformation device 5. A correction unit 41 having an input also connected to the output of the angle counter 10 is connected with one of its outputs to the adder 40. The correction signal is added to the control signal representing the unbalance angle in the adder 40. For example, if screws are located in certain angular zones of the body to be balanced, it would not be possible to perform the balancing operation in such zone or zones. To this end the correction unit is provided with two control inputs 42 and 43 to which signals are supplied which represent characteristic features of such zone or zones, for example, the center position of the zone and its half width or its upper or lower boarder or margin and its width. Alternately, the signals supplied to the inputs 42 and 43 may also represent the upper and lower margin of such zones. This feature of the invention has the further advantage that instead of designating the zones which may not be used for the balancing operation, one could designate zones in which the balancing operation may be performed. This latter feature is especially advantageous where the ridges or zones in which the balancing may be performed are rather small.

During the ascertaining of the unbalance, the correction unit 41 does not provide any correction signal. Accordingly, the unvaried unbalance angle $a$ is ascertained after this angle is indicated or counted by the counter 10, the counter is arrested and that value is fixed. Thereafter the fixed value is compared with the value supplied to the adjustment inputs 42 and 43 to see whether the fixed value derived from the counter 10 falls within the desired zone, for example, if the comparison is to show whether the unbalanced angle is located in a zone where a balancing operation may not be performed, the correction unit 41 will provide a respective signal. If the unbalance angle is located in a zone where the balancing may be performed, the correction unit 41 will not provide any signal. Accordingly, the balancing operation will be performed at the location of the unbalance angle. However, if the unbalance angle is located in a zone where the balancing operation may not be performed, then the correction unit 41 will supply a positive angular value to the adder 40 for the performance of a first balancing operation. To this end, the value provided by the correction unit 41 is added to the output of the counter 10, in the adder 40. The correction unit 41 simultaneously supplies through its output conductor 44 a signal to the memory 17, which also stores the unbalance representing value. The memory 17 includes a multiplier which multiplies the ascertained unbalance value with a factor supplied to the control input 46. The factor at the control input 46 or the respective signal depends on the angular value provided by the correction unit 41. During a second balancing operation or step, a negative angular value is then added to the ascertained unbalance angle.

The correction angles may be equal to each other, which corresponds to splitting the unbalance angle into symmetric components. If the correction angle is selected to be ± 60°, it is not necessary to correct the unbalance value. However, it is also possible to round off the unbalance angle to the neighboring component directions. In the alternative, it is possible to perform a balancing operation, such as a balancing machining at the margins of the zone in which the balancing machining may not be performed. In these instances the correction angles would normally be not equal to each other. Accordingly, it is necessary to split the ascertained unbalance value in accordance with the sine law.

Where the balancing operation is performed in several steps, it is possible to store the characteristic angular values of the preceding balancing operation in the correction unit 41 to define zones in which the balancing must not be performed again. The prevention of a balancing operation in a zone or area in which such operation has been performed in a preceding balancing step has the advantage, that it is not possible to remove too much material from one spot on the body to be balanced.

Another advantage of the invention is seen in that it is especially suitable for the balancing of thin bodies to be balanced, such as relatively thin shafts or the like, in which during each balancing step only a predetermined maximum value of the unbalance may be balanced. To this end, the ascertained or measured unbalance value is compared with the permitted maximum value prior to the adjustment of the body to be balanced into the balancing position. If the measured unbalanced value is smaller than the permitted maximum value, the balancing operation may be performed directly. On the other hand, if the measured unbalance value is larger than the permitted maximum value, the balancing operation must be performed in at least two partial steps in accordance with an unbalance angle split up into at least two components, whereby in each step the unbalance value is varied by a preadjustable ratio or value.

To this end a comparator circuit 50 is provided having two control inputs, one of which is connected to the output conductor 7 of the coordinate transformation device 5.

The other input is an adjusting input 51 which receives the above mentioned maximum value to the extent of which the balancing operation may be performed. If the result of the comparison shows that the output value on line 7 is smaller than the predetermined maximum value at the input 51, the comparator 50 will not provide an output signal at its output 52 connected to the adder 40. Accordingly, the body to be balanced will be rotated into the balancing position in accordance with the unchanged unbalance angle. Simultaneously no signal appears on the second output line 53 of the comparator 50. Accordingly, the unbalance value will be balanced without any variation. On the other hand, if the ascertained unbalance value exceeds the permitted maximum value the balancing operation will be performed in several partial steps in response to supplying through the conductor 52 sequentially two or more correctional values to the adder 41, whereby the ascertained unbalance value is divided in accordance with a signal supplied to the memory 17 through the conductor 53 from the comparator 50, whereby said signal determines the ratio in which the ascertained unbalance value is divided.

Figure 2:
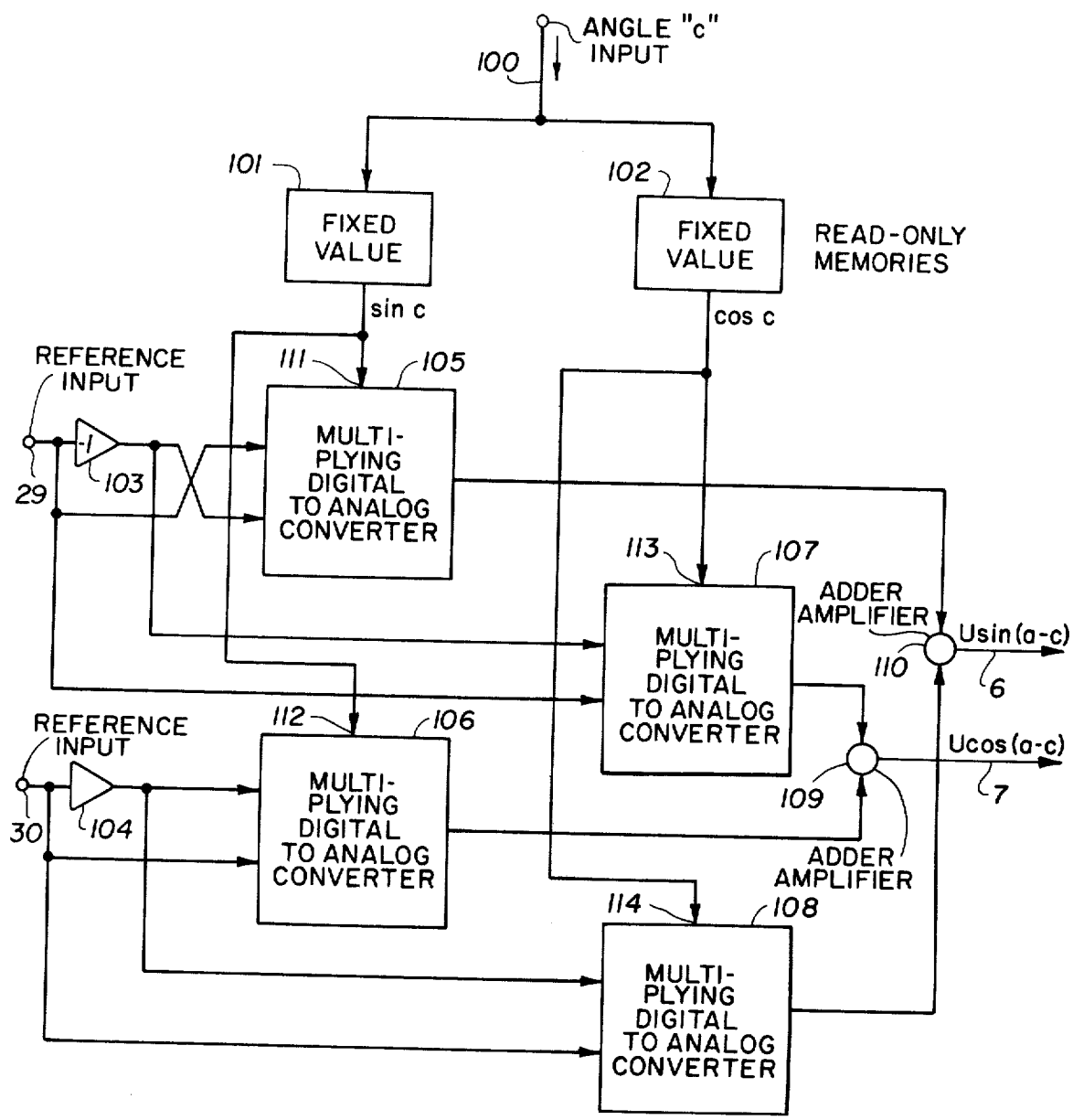
FIG. 2 illustrates in block form a circuit diagram of the coordinate transformation device which may be employed in the circuit of FIG. 1 and arranged for cooperation with a control member adjustable in discrete steps.

FIG. 2 illustrates a block diagram of one electronic embodiment of a digitally controlled coordinate transformation device 5. The angle $c$ is supplied through a conductor 100 to two read only memories 101 and 102 which are programmed as a sine table and as a cosine table respectively. The signals appearing at the outputs of these read only memories 101 and 102 represent digital numbers corresponding to sin $c$ and cos $c$. The signals are supplied to the digital inputs 111, 112, 113 and 114 of four multiplying digital to analog converters (MDA) 105, 106, 107, and 108. These converters comprise reference inputs connected to conductors 29 and 30. Inverting amplifiers 103 and 104 are provided for supplying the reference signals either directly or with an inverted polarity to the multiplying digital to analog converters. The converters 105 to 108 multiply the digital number or signal sin $c$ or cos $c$ applied to one of their respective inputs with the analog voltage U sin $a$ or U cos $a$ applied to the respective other input in order to produce a proportional analog output signal. These output signals of the converters 105 to 108 are combined in adder members 109 or 110 which for example are computing amplifiers, whereby the combination results in output voltages U sin $(a-c)$ or U cos $(a-c)$. As a result, the two d.c. voltages corresponding to the unbalance components have been subjected according to the invention to a coordinate rotation by the angle $c$ whereby such angle may be controlled by a given predetermined digital number.

The coordinate transformation device 5 may also be realized according to the invention in a mechanical analog manner by employing two sine - cosine potentiometers, which are mounted on a shaft. In that embodiment the conductor 29 would be connected to the first sine - cosine potentiometer, while the second conductor 30 would be connected with the second sine - cosine potentiometer. The cosine output of the first potentiometer and the inverted sine output of the second potentiometer would be connected to an adder, the output of which is connected to the conductor 6. Further, the sine output of the first potentiometer and the cosine output of the second potentiometer are connected with the inputs of a further adder which is connected with its output to the conductor 7. In this embodiment the control input to the coordinate transformation device would be realized by the position of the potentiometer tab.

Another preferred embodiment of the coordinate transformation device 5 is illustrated in FIG. 3, wherein standard elements such as operational amplifiers, resistors, and electronic switching means are employed. The angle counter 10 comprises counting units or stages operating in the dual code, whereby the highest counting stage will represent the angle of 180°. The next following lower value stages will correspond to an angle of 90°, to an angle of 45° and so forth. The number of counting stages or units to be employed will depend on the desired accuracy.

The device 5 as illustrated in FIG. 3 comprises a first section 5a, which is controlled by the three highest value counting units 10a. The input voltages supplied through the conductors 29 and 30 are switched by the switches 207, 208 209, and 210 to be connected to operational amplifiers 201 and 202 through evaluating resistors 211. The operational amplifiers 201 and 202 at these input voltages and the switches 207 to 210 operate in response to the counting state of the counting units 10a. When the term switch or switching means is used in this context, it means electronic switching means preferably field effect transistors. However, in order to keep the illustration simple, merely symbolic contacts are shown. These switches or switching means are energized through driver stages 213 and a decoding logic circuit means 212 which is operated by the signals provided by the angle counter units or stages 10a.) The ratio of the resistance values of the feedback resistors 250 of the computing amplifiers 201 or 202 to the evaluating resistors 211a, 211b, 211c, and 211d corresponds to the following values respectively: 1 : 1/sin 22.5°; 1 : 1/cos 22.5°; 1 : ½ sin 22.5°; 1 : ½ cos 22.5°. In addition it is possible to exchange the input voltages against each other through switching means 203 and 204. A polarity change or reversal of the input voltages may be accomplished by means of inverting amplifiers 205 and 206. In this manner, it is possible to produce at the outputs of the amplifiers 201 and 202 all voltages resulting from the input voltages by rotation through a fixed angle of 22.5° and further rotation in steps of 45° each.

*) The driver stages 213 convert the voltage level of logic 212 to the voltage level required for controlling the electronic switching means.

A further coordinate rotation in discrete steps and in a linear approximation is accomplished in a second section 5b of the coordinate transformation device 5, whereby such further rotation takes place in that 45° range which has been selected by the first section 5a in response to the digital number provided by the counter section 10a. To this end, the output voltages of the first section 5a are added up in operational amplifiers 231 or 232 through groups of individually switchable evaluating resistors 234 or 235 and after at least partially inverting the polarity of these voltages in inverting amplifiers 216 and 217.

In the embodiment shown in FIG. 3, the 45° range is divided into 64 steps which means that the second section 10b comprises six counting units which energize means of driver stages 218 respective switching means 219 to 230. The resistor values which may be switched into the circuit are, just as the counting units provided in steps, that is in binary steps, whereby the following ratios of the feedback resistor 260 of the inverting amplifier 231 takes up the following ratios to the evaluating resistors 235a to 235h: 1 : 1; 1 : r; 1 : 2r; 1 : 4r; 1 : 8r; 1 : 16r; 1 : 32r; 1 : r. Between the feedback resistor 261 of the inverting amplifier 232 and the evaluating resistors 234a to 234h the following ratios are established: 1 : 1; 1 : 2r; 1 : 4r; 1 : 8r; 1 : 16r; 1 : 32r; 1 : 64r; 1 : 2r. In both instances "r" is a constant which depends on the selected approximation or accuracy; preferably r is equal to 2,445. The output voltages of the operational amplifiers 231 or 232 provide the voltages which are transformed by the angle c and which appear at the respective output conductors 6 or 7. The transformation furnishes correct values on the conductor 7 in response to variations of c in the vicinity of the 0 point or origin. Similarly, correct values are furnished on the output conductor 7 when c varies in the vicinity of the maximum of the voltage.

FIG. 4 illustrates an embodiment of the control circuit 8 which controls the counter 10 in response to the signals appearing at the output conductors of the coordinate transformation device 5. Simultaneously, the control circuit 8 serves for producing the signal for adjusting the body to be balanced into its proper balancing position. The control circuit 8 comprises a pulse generator 304 connected through logic circuit means 305 to the digital counter 10 which is of the forward and backward counting type. The logic circuit means 305 are controlled by the output signals supplied by three comparator circuits 301, 302, and 303. These comparator circuits differentiate between the following conditions: voltage on the output conductor 6 is positive, comparator 302 operates; voltage on conductor 6 is negative, comparator 301 operates; voltage on conductor 7 is positive, comparator 303 operates. Between the condition that the conductor 6 is positive and the condition that the conductor 6 is negative there is a zone in which the conductor is at 0 potential. This is accomplished by the fact that the response threshold of the comparators 301 and 302 is made dependent on the voltage on the output conductor 7 by means of resistors 307 and 309. *) The logic circuit means 305 cause the counter 10 to step the highest counting stage by one step in response to a negative voltage on the conductor 7, that is, to rotate the coordinates by 180°. When the voltage on conductor 6 is positive the logic circuit means cause the counter to count one step in the forward direction. When the voltage on the conductor 6 is negative, the logic circuit means cause the counter to count one step in the reverse direction. When the voltage becomes zero on the conductor 6, that is upon reaching of the unbalance angle, the logic circuit means stop the counter 10. Furthermore, a stop signal supplied to the control input 318 of the logic circuit means 305 will stop the counter independently of the output conditions of the comparator stages 301 to 303. In this manner the counter 10 may be arrested or stopped for the purpose of storing the unbalance angle and for indicating the unbalance angle as well as for the further processing of the respective unbalance angle representing signal for the proper adjustment of the body to be balanced into its balancing position.

*) Preferably resistors 306 ... 309 are chosen so that comparators 301 and 302 switch if the amount of voltage at line 6 equals 1 percent of the amount of voltage at line 7.

As shown in FIG. 1, FIG. 4 also illustrates the connection of the control circuit 8 to the control voltage generator 26, which produces the control signal for the adjustment of the body to be balanced. To this end the outputs of the comparator stages 301 to 302 are connected to further logic circuit means 310 which is thus also controlled in response to the voltages appearing on the output conductors 6 and 7. The logic circuit means 310 in turn activates electronic switching means 311, 312, and 313 to respective driver stages. If the voltage on the conductor 7 is positive the switch 311 will connect the voltage on conductor 6 to the adjustment signal output 28. If the voltage on the conductor 7 is negative and the voltage on the conductor 6 is positive, the logic circuit means 310 will open the switching means 311 and 313 while simultaneously closing the switch 312, whereby the signal on the conductor 7 will be connected to the adjustment signal output 28, after that signal has been transformed in the operational amplifier 314. Suitably the resistors 316 and 317 as well as a auxiliary voltage 310 are selected in such a manner that an adjustment signal is produced which is continuous over the entire angle range without having an ambiguity at 180°. A signal approximating a function which is symmetrical to the origin and which represents between 0° and 180° the positive branch of a route function, is especially suitable for this purpose. If the voltages on the conductors 6 and 7 are negative, the logic circuit means 310 will close the switch 313 and open the switches 311 and 312, whereby the output signal of the computing amplifier 314 is supplied to the adjustment signal output 28 after inversion by the operation amplifier 315.

The operational of the present invention will now be further illustrated with reference to an example. Let it be assumed that the input voltages U cos d and U sin d are applied to the input terminals 29 and 30 in FIG. 3. A rotation of the angular reference system by $22.5° + k \cdot 45°$ is performed in a first transformation step. The value $k$ is determined by the three highest value bits in the angle counter units 10a, 10b and may be within the range of $k = 0 \ldots 7$. Two voltages are produced:

$$-U_1 = U \sin(d - 22.5° - k \cdot 45°) \quad (1)$$
$$-U_2 = U \cos(d - 22.5° - K \cdot 45°) \quad (2)$$

By applying trigonometrical addition we obtain:
$$-U_1 = U \sin D \cos(22.5° + k \cdot 45°) - U \cos D \sin(22.5° + k \cdot 45°) \quad (3)$$

$U_2 = U \cos d \sin(22.5° + k·45°) + U \sin d \cos(22.5° + k·45°)$ (4)

For the individual octant values for $k=0 \ldots 7$ the following table applies:

TABLE I

| k | $\cos(22.5°+k·45°)$ | $\sin(22.5°+k·45°)$ |
|---|---|---|
| 0 | cos22.5° | sin22.5° |
| 1 | sin22.5° | cos22.5° |
| 2 | −sin22.5° | cos22.5° |
| 3 | −cos22.5° | sin22.5° |
| 4 | −cos22.5° | −sin22.5° |
| 5 | −sin22.5° | −cos22.5° |
| 6 | sin22.5° | −cos22.5° |
| 7 | cos22.5° | −sin22.5° |

Thus, for performing the calculations according to the equations 3 and 4, the input voltages U sin *d* and U cos *d* are provided with the suitable plus or minus and with the factors sin 22.5° or cos 22.5° respectively, whereupon the addition is performed in the operational amplifiers 201 and 202 (FIG. 3) via the evaluating resistors 211. The polarity (plus or minus) of the respective signals is determined by exchanging the input voltages by means of electronic switches 203, 204 and by using the inverting amplifiers 205, 206 as well as electronic switches 207 to 210.

Example $U \cos d = +4V$
$U \sin d = -3V$

According to equations (3) and (4) the following voltages are obtained:

TABLE II:

| k | $-U_1|V|$ | $-U_2|V|$ |
|---|---|---|
| 0 | −4.302 | 2.548 |
| 1 | −4.844 | −1.242 |
| 2 | −2.548 | −4.302 |
| 3 | 1.242 | −4.844 |
| 4 | 4.302 | −2.548 |
| 5 | 4.844 | 1.242 |
| 6 | 2.548 | 4.302 |
| 7 | −1.242 | 4.844 |

A further angular rotation in $n=0 \ldots 63$ steps is performed in a second transformation operation with regard to voltages $-U_1$ and $-U_2$ whereby $n$ is provided by the six last bits of an angle counter unit 10a, 10b. The output voltages $A_1$ and $A_2$ are calculated from the following equations:

(5) $A_1 = -U_1 - U_2 \cdot 0.409 \left(\frac{32-n}{32}\right)$ (6) $A_2 = -U_2 + U_1 \cdot \frac{1}{2} \cdot 0.409 \left(\frac{32-n}{32}\right)$ These equations show that a portion of one voltage is added with the proper polarity to the respective other voltage and vice versa, whereby the respective voltage portion is provided through the electronic switches 219 to 230 and through the evaluating resistors 234, 235 which are correlated to each other in binary steps *a* to *h*. The addition is performed by the operational amplifiers 231, 232. The polarity inversion or reversal is accomplished by invertors 216, 217.

From equations (5) and (6) it may be seen that for any given $k$, that is, within an octant in which $-U_1$ and $-U_2$ do not vary, $A_1$ and $A_2$ form a stair step function having steps varying in a linear manner for $n=0 \ldots 63$.

The starting and end values are calculated, for example, as follows:

$A_1 = -U_1 - U_2 \cdot 0.409$
$A_2 = -U_2 + U_1 \cdot \frac{1}{2} \cdot 0.409 =$ wherein $n = 0$ and $A_1 = -U_1 + U_2 \cdot 0.409 \cdot 31/32$
$A_2 = -U_2 - U_1 \cdot \frac{1}{2} \cdot 0.409 \cdot 31/32 =$ wherein $n = 63$ Table III represents the respective values as follows:

TABLE III:

| | n=0 | | n=63 | |
|---|---|---|---|---|
| k | $A_1/V$ | $A_2/V$ | $A_1/V$ | $A_2/V$ |
| 0 | −3.260 | 3.428 | −5.312 | 1.695 |
| 1 | −5.352 | −0.251 | −4.352 | −2.202 |
| 2 | −4.308 | −3.781 | −0.844 | −4.807 |
| 3 | −0.738 | −5.098 | 3.162 | −4.598 |
| 4 | 3.260 | −3.428 | 5.312 | −1.695 |
| 5 | 5.352 | 0.251 | 4.352 | 2.202 |
| 6 | 4.308 | 3.781 | 0.844 | 4.807 |
| 7 | 0.738 | 5.098 | −3.162 | 4.598 |

Incidentally, in the center of an octant, that is, for $n = 32$ the values for $A_1$ and $A_2$ yield the values for $-U_1$ and $-U_2$. The table values may, of course, also be traced as respective curves whereby it will be apparent that $A_2$ jumps when switching from one octant to the other, while $A_1$ displays a course similar to a sine curve.

An example of the operation of the calculator of FIG. 3 will now be described. It is assumed that as the result of a previous measuring the counters 10a, 10b are representing a count corresponding to $k = 1$ and $n = 32$, whereby the transformation circuit of FIG. 3 will provide:

$A_1 = -4.844V$ and $A_2 = -1.242V$

The comparator 303 ascertains that $A_2$ is negative. As a result, the logic circuit 305 (FIG. 4) will make certain that the highest bit of the counter 10 will be changed in response to the next clock pulse from the clock pulse generator 304. This change corresponds to a 180° jump or $k$ jumps by 4, namely from $k = 1$ to $k = 5$. $n$ remains unchanged $n = 32$, $A_1$ and $A_2$ become $A_1 = 4.844V$; $A_2 = 1.242V$.

The comparator 302 ascertains that $A_1$ is now positive and causes a step up or forward counting of the counter 10 to $n = 33$ under the control of the logic circuit 305 and in response to the next clock pulse. Since $A_1$ still remains positive, the operation is repeated until $n = 63$. The next step results in $k = 6$ and $n = 0$. After sixtythree further steps $k = 6$ and $n = 63$. Since $A_1$ is still positive counting continues to $k = 7$ and $n = 0$.

Having regard to Table III and the equations (5) and (6), the following values are reached after further counting steps:

TABLE IV:

| k=7 | n=11 | $A_1 = 0.06V$ | $A_2 = 5.011V$ |
|---|---|---|---|
| | n=12 | $A_1 = -0.002V$ | $A_2 = 5.003V$ |
| | n=13 | $A_1 = -0.064V$ | $A_2 = 4.995V$ |

The comparator 302 compares $A_1$ with a value corresponding to 1 percent of $A_2$. This is accomplished by correspondingly dimensioning the resistors 308, 309. For $n = 11$, is still $A_1 > 0.01 \cdot A_2$ so that comparator 302 ascertains a positive value and counter 10 receives a further clock pulse. However, for $n = 12$ $A_1$ becomes $A_1 < 0.01 \cdot A_2$. At this point, comparator 301 has not yet acted since it becomes operative when $A_1 + 0.01 \cdot A_2$ becomes negative. As a result, logic circuit 305 blocks further clock pulses from reaching counter 10 which stops at $k = 7$ and $n = 12$. If the counter could count one more step $A_1 + 0.01 \cdot A_2$ would become negative for $n$ = 13 and the comparator 301 would become effective whereby the next clock pulse would reach the counter under the control of the logic circuit 305 to cause a backward count in the counter 10 so that $n = 12$ again. Thus, amount of $A_1$ less than 1 percent of $A_2$, i.e. approximately $A_1 = 0$ is always positively established in the shortest possible manner, after 129 steps at the most.

The value for the respective angle d is then ascertainable according to the following equation.

$$d = (k+n/64)\cdot 45° \quad (7)$$

Thus, for $k = 7$ and $n = 12$.

$$d = (7+12/64)\cdot 45° = 323.44°$$

For U cos $d = 4V$ and U sin$d = -3V$.

$$d = 323.15° \text{ (calculated)}$$

For an angular step of $n = 1$ corresponding to $45°/64 = 0.703°$ the computing circuit has reached the nearest possible value. At this point, $A_2$ corresponds to exactly 5V and is calculated to be 5.003V.

In view of the foregoing, it will be appreciated that the embodiment of the coordinate transformation device 5 which is constructed for an approximation in the ascertaining of the unbalance angle is economically most advantageous. Such embodiment comprises two sections. The d.c. voltages corresponding to the unbalance are multiplied by a constant in a first section, if desired, after polarity inversion and exchange against each other. In a second section fractions of the respective other output voltages are added or subtracted to the output voltages of the first section.

Further, as mentioned above, it is a special advantage of the invention that the ambiguous signal coming from the coordinate transformation device 5 will result in a definite adjustment of the body to be balanced, since the invention avoids the ambiguity by converting the ambiguous signal into a definite signal by means of comparators, operational amplifiers, resistors, and electronic switching elements in response to the output voltages of the coordinate transformation device 5.

Although the invention has been described with reference to specific example embodiments, it is to be understood, that it is intended to cover all modifications and equivalents within the scope of the appended claims.

Referring to FIG. 4, to obtain an unambiguous signal at line 28 according to the angle difference between unbalance and the position of the body to be balanced, resistors 316, 317 in connection with the feedback resistor of amplifier 314 are preferrably chosen so that at the output of amplifier 314 a voltage proportional to $1 - 0.41\cdot\cos(d-c)$ is obtained, whereby $\cos(d-c)$ is the voltage at line 7 and the constant value 1 is established by the constant voltage source 320. The two resistors associated with amplifier 315 are of equal value, so that at the output of amplifier 315 the inverted voltage $-1 + 0.41\cdot\cos(d-c)$ appears.

What is claimed is:

1. A method of processing first and second d.c. voltages, each of which represents information having angular amplitude components; comprising applying said voltages to separate inputs of a coordinate transformation means, adjusting a closed loop control means connected to a control input of said coordinate transformation means in discrete steps in response to the output voltage of said transformation means, until the output voltage of said coordinate transformation means corresponding to one of said d.c. voltages becomes equal to 0, whereby the other output voltage of said coordinate transformation means represents said amplitude component and the output of said control means represents said angular components of said information, and digitally indicating and storing said discrete steps.

2. A method of processing first and second d.c. voltages having amplitudes corresponding to U sin $a$ and Ucos $a$ respectively, where U represents information corresponding to the amplitude of a condition and $a$ represents information corresponding to the angle of said condition; comprising developing a voltage having an amplitude c, transforming said first and second voltage with said voltage c to produce voltages having amplitudes U sin $(a-c)$ and U cos $(a-c)$ respectively, adjusting said voltage (c) in a closed loop in response to said voltage U sin $(a-c)$ in discrete steps until said voltage U sin $(a-c)$ becomes 0, whereby said voltage c represents said angle $a$ and the voltage U cos $(a-c)$ becomes equal to the information quantity $U$, and digitally indicating and storing said discrete steps.

3. A method for positioning a body to be balanced at an angular position corresponding to the angular location of the unbalance, comprising applying first and second d.c. voltages representing unbalance components to separate inputs of coordinate transformation means, adjusting a control means connected to a control input of said coordinate transformation means as a function of the output voltages of the coordinate transformation means until one of the coordinate transformation means output voltages becomes 0, whereby the other output voltage of the coordinate transformation means represents the unbalance amplitude and the output of the control means represents the angular position of the unbalance of said body to be balanced, then providing a signal corresponding to the angular position of said body, and comparing said signal with said output of said control means.

4. The method of claim 3, wherein said step of providing a signal corresponding to the angular position of said body comprises providing two voltages corresponding to instantaneous positions of said body to be balanced, said step of comparing comprising applying said two voltages to separate inputs of coordinate transformation means, applying the output of said control means representing the angular position of unbalance to the control input of said coordinate tranformation means, and then rotating said body to be balanced as a function of the output voltages of said last mentioned coordinate transformation means until one output voltage thereof becomes 0 and the other output voltage thereof has a predetermined polarity.

5. The method of claim 4, for compensating the unbalance of a body to be balanced which cannot be balanced in all angular ranges, comprising comparing the output of said control means representing the angular position of unbalance of said body with at least two values corresponding to angular ranges in which said body cannot be balanced, and supplying the value resulting from said last mentioned comparing step to said coordinate transformation means.

6. The method of claim 5, wherein said step of applying the results of said last mentioned comparing step to said coordinate transformation means comprises applying said result directly to said coordinate transformation means.

7. The method of claim 5, wherein said step of applying the result of said last mentioned comparing step comprises separating said results into at least two components prior to application thereof to said coordinate transformation means.

8. The method of claim 4 for compensating the unbalance of a body to be balanced, wherein the compensation by machining of said body at a given location thereon is permitted only for unbalance values less than a given maximum unbalance value, comprising comparing said output of said control means representing the angular position of unbalance with a value corresponding to said maximum unbalance value prior to the positioning of the body to be balanced for a balancing operation, and directly compensating said unbalance in response to values below said maximum value.

9. The method of claim 4 for compensating the unbalance of a body to be balanced, wherein the compensation by machining of said body at a given location thereon is permitted only for unbalance values within a given maximum unbalance value, comprising comparing said output of said control means representing the angular position of the unbalance with a value corresponding to said maximum unbalance value, prior to positioning the body to be balanced for a balancing operation, and compensating said unbalance by machining in at least two partial steps in response to values of the output of said control means exceeding said maximum value, whereby the unbalance angle is separated into at least two components, and whereby the unbalance amplitude is varied by a preadjustable ratio.

10. The method of claim 3, wherein said step of adjusting said control member comprises adjusting said control member in discrete steps, and further comprising digitally indicating and storing said discrete steps, said step of providing a signal comprising employing a digital code disk on said body to be balanced for generating a coded signal corresponding to the instantaneous angle of said body to be balanced, and said step of comparing comprises subtracting the coded signal from the output of said control means representing the angular position of the unbalance, and employing the difference thereof for positioning said body to be balanced.

11. The method of claim 10, further comprising transforming the difference between said coded signal and said output of said control means to a control voltage.

12. An apparatus for the processing of first and second d.c. voltages representing information having angular and amplitude components, comprising a coordinate transforming means having first and second inputs for receiving said first and second d.c. voltages respectively, a control input, and first and second outputs corresponding to said first and second inputs respectively, control means providing a control voltage, means applying said control voltage to said control input for transforming the coordinates of said first and second d.c. voltages at said first and second outputs in response to said control voltage, and means for continuously adjusting said control means in response to the presence of an output of said coordinate transformation means and independent of the amplitude thereof until the voltage at one of said outputs of said control transformation means becomes 0.

13. The apparatus of claim 12, wherein said coordinate transformation means comprises four multiplying digital to analog converters, means applying said d.c. voltages directly and inversely to separate inputs of said digital to analog converters, first and second memory means for producing digital output signals corresponding to the sine and cosine respectively of input signals applied thereto, means applying the output of said control means to said first and second memory means, means applying the output of said first memory means to two of said digital to analog converters and the output of said second memory means to the remaining of said digital to analog converters, and adding means connected to the outputs of said digital to analog converters for combining the outputs thereof to produce output signals corresponding to said first and second d.c. signals transformed in response to the output of said control means.

14. The apparatus of claim 12, wherein said coordinate transformation means comprises first means for multiplying said first and second d.c. voltages by constants to produce a pair of output voltages and second means connected to the output of said first means for adding to or subtracting from each output of said pair of outputs a fraction of the other output of said pair of outputs in response to the output of said control means.

15. The apparatus of claim 12, for producing a definitive positioning control signal as a function of the output of said coordinate transformation means, comprising an output terminal, switch means connected to selectively apply the outputs of said coordinate transformation means to said output terminal, polarity sensing means connected to the outputs of said coordinate transformation means, and logic means responsive to the outputs of said polarity sensing means for controlling said switch means.

16. The apparatus of claim 15, wherein said polarity sensing means comprises a first comparator having a first input connected to a reference potential and a second input, separate resistors connecting said first input to the outputs of said coordinate transformation means, a second comparator having first and second inputs, means connecting said first and second inputs of said comparator to the outputs of said coordinate transformation means, and a third comparator having a first input connected to a reference potential and a second input connected to one of the outputs of said coordinate transformation means, said apparatus further comprising first and second operational amplifiers connected in series to one of the outputs of said coordinate transformation means, said switch means comprising a first switch connected between said output and the other output of said coordinate transformation means, a second switch connected between said output terminal and the output of said first operational amplifier, and a third switch connected between said output terminal and the output of said second operational amplifier means, and means applying an auxiliarly voltage to the input of said first operational amplifier.

17. An apparatus for processing first and second d.c. voltages representing information having angular and amplitude components comprising coordinate transformation means having first and second inputs adapted to receive said first and second d.c. voltages, a control input, and first and second outputs for providing output voltages corresponding to said first and second d.c. voltages respectively transformed by a voltage at said control terminal, a digital counter, means connecting said counter to said control terminal, and control means responsive to the voltages at the output of said coordinate transformation means for controlling the counting direction of said digital counter in response to the polarity of voltages at the outputs of said coordinate transformation means, and to the condition of 0 voltage at one of the outputs of said coordinate transformation means for stopping said digital counter.

18. The apparatus of claim 17, further comprising means for stopping said digital counter, a source of two adjustable d.c. signals representing adjustable angular inforamtion and switch means for selectively connecting said first and second d.c. voltages and said two d.c. signals to the inputs of said coordinate transformation means.

19. The apparatus of claim 18, further comprising adding means connected between the output of said digital counter and said control terminal, and correcting unit means for applying correction signals to said adding means.

20. The apparatus of claim 19, further comprising comparator means having a first input connected to one of the outputs of said coordinate transformation means, a source of control signals connected to a second input of said comparator means, an analog memory connected to said output of said coordinate transformation means, said comparator means having a first output for applying correction signals to said adding means and a second output connected to said analog storage means for applying correction signals to said coordinate transformation means and dividing the voltage stored in said memory means when the voltage on said one output of said coordinate transformation means exceeds the voltage at the second input of said comparator means.

* * * * *

UNITED STATES PATENT OFFICE
CERTIFICATE OF CORRECTION

Patent No. 3,932,740　　　　　　　　　Dated January 13, 1976

Inventor(s)　　　Martin Mueller

It is certified that error appears in the above-identified patent and that said Letters Patent are hereby corrected as shown below:

Claim 1, line 3 between "angular" and "amplitude" please insert the word --and--

Claim 18, line 4 please correct the spelling of "information"

Signed and Sealed this fourth Day of May 1976

[SEAL]

Attest:

RUTH C. MASON
*Attesting Officer*

C. MARSHALL DANN
*Commissioner of Patents and Trademarks*